US008762634B2

(12) United States Patent
Gensler, Jr. et al.

(10) Patent No.: US 8,762,634 B2
(45) Date of Patent: Jun. 24, 2014

(54) EFFICIENTLY RESTORING DATA FROM A SEQUENTIAL-ACCESS BACKUP ARCHIVE

(75) Inventors: Robert Stanley Gensler, Jr., Vail, AZ (US); Andrew Nelson Wilt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 12/605,324

(22) Filed: Oct. 24, 2009

(65) Prior Publication Data

US 2011/0099328 A1     Apr. 28, 2011

(51) Int. Cl.
*G06F 12/00*     (2006.01)

(52) U.S. Cl.
USPC ............... 711/111; 711/4; 711/162; 707/679

(58) Field of Classification Search
USPC .......................................................... 711/111
See application file for complete search history.

(56) References Cited

U.S. PATENT DOCUMENTS

| 5,485,606 A * | 1/1996 | Midgdey et al. ............. 1/1 |
| 6,266,679 B1 | 7/2001 | Szalwinski et al. |
| 6,938,180 B1 * | 8/2005 | Dysert et al. ............ 714/6.23 |
| 2002/0107877 A1 | 8/2002 | Whiting et al. |
| 2003/0065882 A1 * | 4/2003 | Beeston et al. ............... 711/111 |
| 2004/0162939 A1 * | 8/2004 | Bartlett ........................ 711/111 |
| 2005/0204108 A1 * | 9/2005 | Ofek et al. .................... 711/162 |
| 2007/0043705 A1 | 2/2007 | Kaushik et al. |
| 2007/0136540 A1 * | 6/2007 | Matlock ........................ 711/162 |

FOREIGN PATENT DOCUMENTS

| IN | WO2007054806 A1 | 5/2007 |
| WO | WO03025795 A1 | 3/2003 |

* cited by examiner

*Primary Examiner* — April Y Blair
*Assistant Examiner* — Prasith Thammavong
(74) *Attorney, Agent, or Firm* — Nelson and Nelson; Daniel P. Nelson; Alexis V. Nelson (57) ABSTRACT

A method for efficiently restoring data from a sequential-access backup archive includes receiving a candidate list identifying data sets that are potentially contained within a sequential-access backup archive. The method further receives a filter list identifying data sets that are desired to be restored from the backup archive. Using the candidate list and filter list, the method generates a search list identifying data sets that are to be ignored when searching the backup archive. The method then sequentially performs multiple searches of the backup archive such that the multiple searches collectively perform a single pass through the backup archive. When performing these searches, each search begins from the last accessed portion of the backup archive and stops upon encountering a data set not explicitly ignored by the search list. A corresponding system, apparatus, and computer program product are also disclosed herein.

25 Claims, 7 Drawing Sheets

| | | | | | | | | | | | | | | | | | | | |
|---|---|---|---|---|---|---|---|---|---|---|---|---|---|---|---|---|---|---|---|
| cand_list { | d1 | d2 | d3 | d4 | d5 | d6 | d7 | d8 | d9 | d12 | d13 | d14 | d16 | d18 | d22 | d27 | d28 | d32 | } |
| filt_list { | | d2 | d3 | d4 | d5 | d6 | d7 | | | | | | d16 | | | d27 | d28 | d32 | } |
| srch_list { | !d1 | | | | | | | !d8 | !d9 | !d12 | !d13 | !d14 | | !d18 | !d22 | | | | } |
| back_list { | d1 | d2 | | d4 | | | | d8 | d9 | | | | | d18 | | | | d32 | } |
| rest_list { | | d2 | | d4 | | | | | | | | | | | | | | d32 | } |

Fig. 4

Approach 1

| Search String | Result |
|---|---|
| S1 - Search for (d2 \| d3 \| d4) | Stops at d2 and restores it |
| S2 - Search for (d3 \| d4 \| d5) | Stops at d4 and restores it |
| S3 - Search for (d5 \| d6 \| d7) | Search fails (go back to start of tape) |
| S4 - Search for (d16 \| d27 \| d28) | Search fails (go back to start of tape) |
| S5 - Search for (d32) | Stops at d32 and restores it |

Fig. 5B

Approach 2

Fig. 6A

| Search String | Result |
|---|---|
| S1 - Search (data set header) | Stops at d1 and does not restore it |
| S2 - Search (data set header) | Stops at d2 and restores it |
| S3 - Search (data set header) | Stops at d4 and restores it |
| S4 - Search (data set header) | Stops at d8 and does not restore it |
| S5 - Search (data set header) | Stops at d9 and does not restore it |
| S6 - Search (data set header) | Stops at d18 and does not restore it |
| S7 - Search (data set header) | Stops at d32 and restores it |

Fig. 6B

Approach 3

| Search String | Result |
|---|---|
| S1 - Search (data set header & !d1 & !d8 & !d9) | Stops at d2 and restores it |
| S2 - Search (data set header & !d8 & !d9 & !d12) | Stops at d4 and restores it |
| S3 - Search (data set header & !d8 & !d9 & !d12) | Stops at d18 and does not restore it |
| S4 - Search (data set header & !d22) | Stops at d32 and restores it |

Fig. 7B

EFFICIENTLY RESTORING DATA FROM A SEQUENTIAL-ACCESS BACKUP ARCHIVE

BACKGROUND

1. Field of the Invention

This invention relates to restoring data, and more particularly to apparatus and methods for restoring data from a sequential-access backup archive.

2. Background of the Invention

A "backup" generally refers to a copy of original data that is created and maintained for recovery purposes. The copy may be used to restore the original data in the event the original data is lost or corrupted. Although most backups share a common purpose, the manner in which data is backed up (also referred to as the "data repository model") can vary significantly. In many cases, a data repository model is based at least partly on the type of storage media used (i.e., whether the backup is stored on magnetic tape, a hard disk, an optical disk, or the like). Once data is backed up, techniques used to recover the data also vary significantly. Such recovery techniques may be based at least partly on the way the backup data was originally stored and structured.

In some cases, backups stored on magnetic tape lack information (such as indexes or waypoints) indicating where data sets are stored in the backup or which data sets are actually included in the backup. In such cases, restoring specific data sets from the backup may be a time-consuming and resource-intensive process. Specifically, restoring data sets in such cases may require reading each data set in the backup to determine if the data set is one to be restored. This may not be a problem where the backup contains a small number of data sets. However, if the backup contains a large number of data sets, reading and inspecting each of the data sets may consume significant processing time and resources.

The above-stated problems may be compounded by the fact that data sets that were requested to be backed up may not reflect the data sets that were actually backed up. The problem may also be exacerbated by the fact that the amount of data in each data set may vary. Thus, a search technique cannot simply treat the backup as an array of fixed size entries to fast forward to a desired data set.

In view of the foregoing, what is needed is an apparatus and method to more efficiently restore data sets from a backup archive having the above-described characteristics. Further needed are apparatus and methods to efficiently search for desired data sets using search commands supported by existing storage controllers. Yet further needed are apparatus and methods to minimize the processing time and resources utilized when performing such searches.

SUMMARY

The invention has been developed in response to the present state of the art and, in particular, in response to the problems and needs in the art that have not yet been fully solved by currently available apparatus and methods. Accordingly, the invention has been developed to provide apparatus and methods to efficiently restore data from a sequential-access backup archive. The features and advantages of the invention will become more fully apparent from the following description and appended claims, or may be learned by practice of the invention as set forth hereinafter.

Consistent with the foregoing, a method for efficiently restoring data from a sequential-access backup archive is disclosed herein. In selected embodiments, such a method includes receiving a candidate list identifying data sets that are potentially contained within a sequential-access backup archive. The method further receives a filter list identifying data sets that are desired to be restored from the backup archive. Using the candidate list and filter list, the method generates a search list identifying data sets that are to be ignored when searching the backup archive. The method then sequentially performs multiple "searches" of the backup archive such that the multiple searches collectively perform a single pass through the backup archive. When performing these searches, each search begins from the last accessed portion of the backup archive and stops upon encountering a data set not explicitly ignored by the search list.

A corresponding system, apparatus, and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer-program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-usable medium embodied in any tangible medium of expression having computer-usable program code stored therein.

Any combination of one or more computer-usable or computer-readable medium(s) may be utilized to store the computer program product. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Similarly, computer program code for carrying out operations of the present invention may be implemented on a single computer or may be implemented across multiple computers, such as multiple computers connected by a network.

The present invention may be described below with reference to flowchart illustrations and/or block diagrams of methods, apparatus, systems, and computer-usable mediums according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
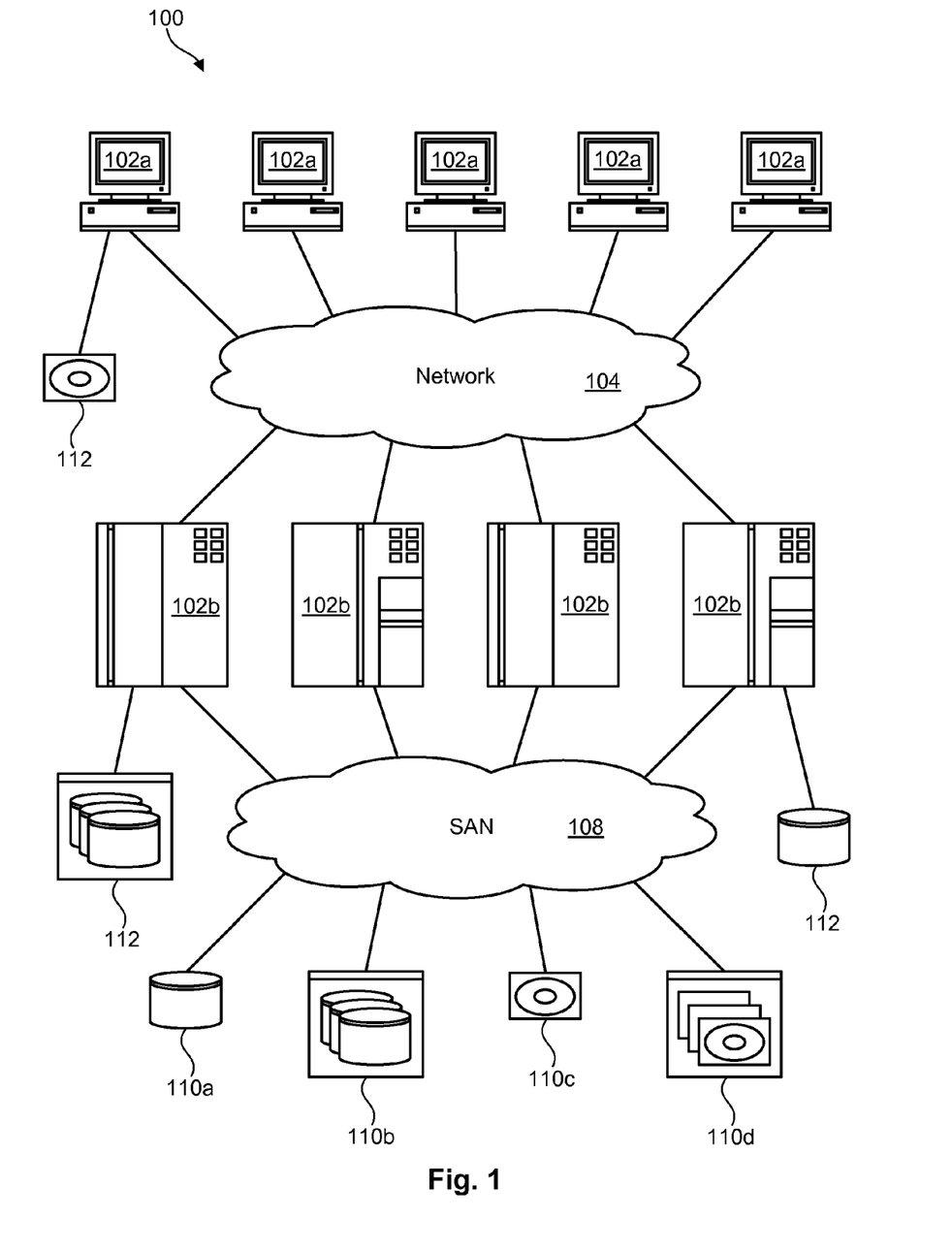
FIG. 1 is a high-level block diagram showing one example of a network environment in which an apparatus and method in accordance with the invention may be implemented.

Referring to FIG. 1, one embodiment of computer-network architecture 100 is illustrated. The architecture 100 is presented to show various scenarios for implementing an apparatus and method in accordance with the invention. The architecture 100 is presented only by way of example and is not intended to be limiting. Indeed, the apparatus and methods disclosed herein may be applicable to a wide variety of different computers, servers, storage systems, and network architectures, in addition to the network architecture 100 shown.

As shown, the computer-network architecture 100 includes one or more computers 102a, 102b interconnected by a network 104. The network 104 may include, for example, a local-area-network (LAN) 104, a wide-area-network (WAN) 104, the Internet 104, an intranet 104, or the like. In certain embodiments, the computers 102a, 102b may include both client computers 102a and server computers 102b. In general, client computers 102a initiate communication sessions, whereas server computers 102b wait for requests from the client computers 102a. In certain embodiments, the client computers 102a and/or servers 102b may connect to one or more internal or external direct-attached storage systems 112 (e.g., hard disk drives, solid-state drives, tape drives, etc.). These computers 102a, 102b and direct-attached storage devices 112 may communicate using protocols such as ATA, SATA, SCSI, SAS, Fibre Channel, or the like. Any or all of the computers 102a, 102b may utilize the apparatus and methods described herein to restore data backed up in the storage devices 112.

The computer-network architecture 100 may, in certain embodiments, include a storage network 108 behind the servers 102b, such as a storage-area-network (SAN) 108 or a LAN 108 (e.g., when using network-attached storage). This network 108 may connect the servers 102b to one or more storage systems 110, such as individual hard disk drives 110a or solid state drives 110a, arrays 110b of hard disk drives or solid-state drives, tape drives 110c, tape libraries 110d, CD-ROM libraries, or the like. Where the network 108 is a SAN, the servers 102b and storage systems 110 may communicate using networking standards such as Fibre Channel (FC). Any or all of the computers 102a, 102b may utilize the apparatus and methods described herein to restore data backed up in the storage devices 110.

Figure 2:
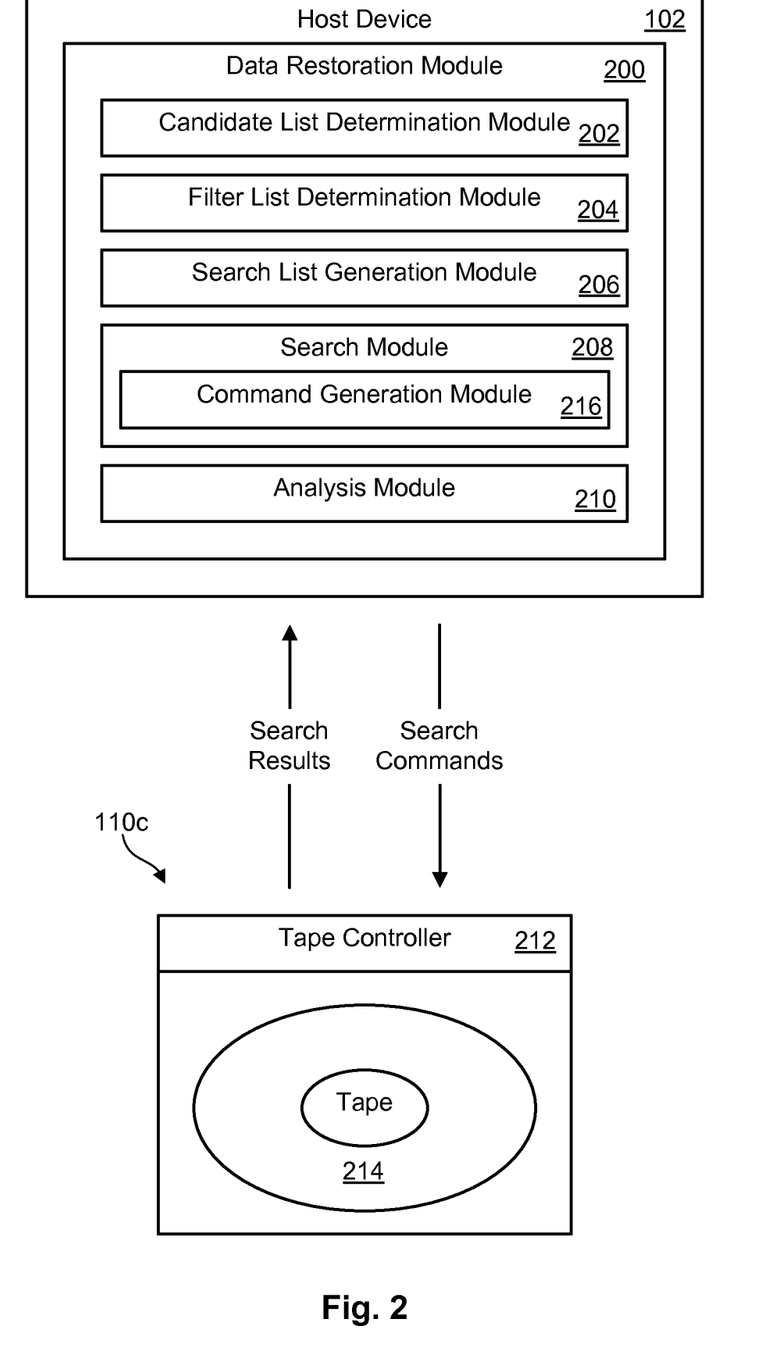
FIG. 2 is a high-level block diagram showing various modules that may be used to efficiently restore data from a sequential-access backup archive.

Referring to FIG. 2, in selected embodiments, the computers 102a, 102b (hereinafter referred to as host devices 102) may connect to one or more sequential-access storage systems 110, 112, such as tape drives or tape libraries. In certain embodiment, these sequential-access storage systems are used to back up data stored on or generated by the host devices 102. This data may include one or more data sets (used to refer generally to files or other collections of data) collectively referred to as a "backup archive." Each data set in the backup archive may be preceded by or contain a header to identify the data set. FIG. 2 shows one example of a host device 102 communicating with a sequential-access storage device, in this example a tape drive 110c. This tape drive 110c may store a backup archive. A tape drive 110c is just one example of a sequential-access storage device and is not intended to be limiting.

In certain cases, the only information that is known about the contents of the backup archive is what data sets are potentially in the archive. In certain embodiments, this information is stored at the beginning of the backup archive just prior to stored data sets. The data sets that are actually in the backup archive is unknown. This is at least partly because certain data sets that may have been intended for backup may have been unavailable when a backup utility executed. For example, a data set may have been unavailable due to an access lock, a lack of authorization to access the data set, or because various filters may have excluded the data set from being backed up. Filters, for example, may exclude data sets from a backup if the data sets have not been modified recently (e.g., modified in the last day or week), or are larger or smaller than some specified size. Whatever the reason, some data sets that were intended for backup may not have actually backed up. This creates a challenge when trying to restore data sets from this type of backup archive.

In selected embodiments, one or more modules may be implemented in a host device 102 to restore data from a backup archive having the above-stated characteristics. These modules may be embodied in hardware, software configured to operate hardware, firmware configured to operate hardware, or a combination thereof. For the purposes of this disclosure, these modules are collectively referred to as a data restoration module 200. In selected embodiments, the data restoration module 200 includes one or more of a candidate list determination module 202, a filter list determination module 204, a search list generation module 206, a search module 208, and an analysis module 210.

The candidate list determination module 202 may be configured to acquire a list (hereinafter referred to as a "candidate list") of data sets that are potentially contained with the backup archive. In certain embodiments, the candidate list is acquired from information stored at the beginning of the backup archive. A filter list determination module 204 may be configured to acquire a list (hereinafter referred to as a "filter list") of data sets that are requested to be restored. Because the data sets that are actually in the backup archive may be a subset of the candidate list, the candidate list and the filter list may be used to identify data sets that are not contained in the backup archive.

Figure 4:
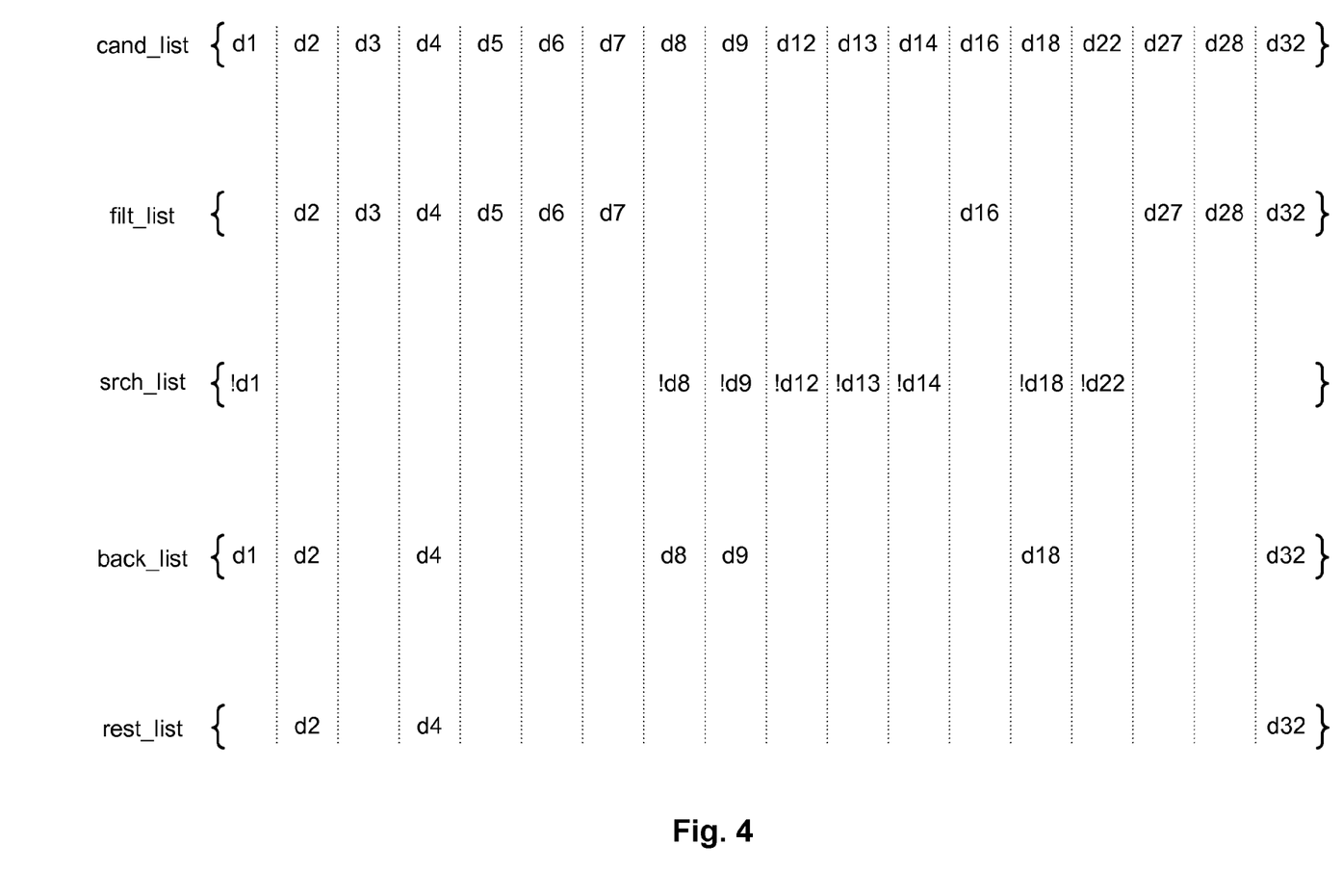
FIG. 4 is a diagram showing one specific example of data sets that may be included in a candidate list, filter list, search list, backup list, and restoration list.

Using the candidate list and the filter list, a search list generation module 206 generates a search list identifying data sets that are to be ignored when searching the backup archive. The search list is generated based on the principle that although the list of data sets in the backup archive in unknown, the list of data sets that are not to be restored may be known in advance. Thus, the search list contains a list of data sets not to be restored. A sample candidate list, filter list, and search list are illustrated in FIG. 4. The utility of the search list will be explained in more detail in the example associated with FIGS. 4, 7A, and 7B.

Once the search list has been generated, a search module 208 sequentially performs multiple searches in the backup archive such that the multiple searches together perform a single pass through the backup archive. Each search that is performed begins from the last accessed portion of the backup archive. Furthermore, each search that is performed stops upon encountering a data set that is not explicitly ignored by the search list. This technique will be explained in more detail in association with FIGS. 7A and 7B.

When performing searches, the search module 208 may generate search commands that are recognized and understood by the sequential-access storage device, in this example the tape drive 110c. A command generation module 216 associated with the search module 208 may generate the search commands necessary to communicate with the tape drive 110. These commands are received by a tape controller 212 which then performs the specified searches on the physical media (i.e., the magnetic tape). Once a search has been executed, the tape controller 212 then returns the results (i.e., data sets) to the host device 102. Once the results are received, an analysis module 210 determines if a data set returned is one that is requested to be restored (by comparing it to data sets in the filter list). If so, the data restoration module 200 restores the data set.

In selected embodiments, the tape controller 212 may support a search command that allows software to search and seek to a given data set in a sequential-access tape instead of having to read each data set individually. This search command may accept a limited number of search strings as input. As will be shown in FIGS. 7A and 7B, this command (along with the search list previously described) may be used to more efficiently search a backup archive that lacks information (i.e., indexes, waypoints, markers, etc.) indicating where data sets are located in the archive and/or which data sets are actually included in the archive.

Figure 3:
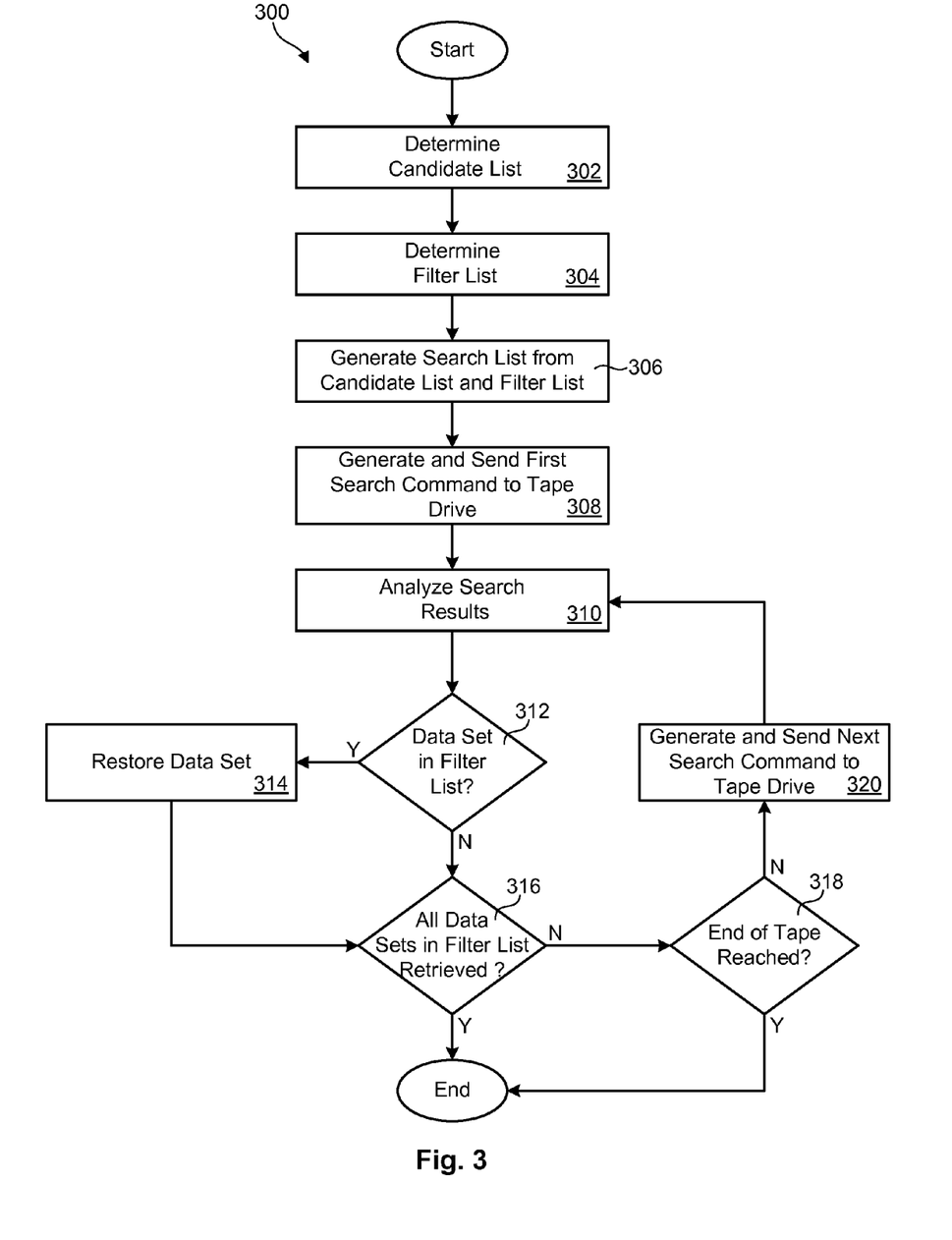
FIG. 3 is a flow diagram showing one embodiment of a method for efficiently restoring data from a sequential-access backup archive.

Referring to FIG. 3, one embodiment of a method 300 for efficiently searching a backup archive having the above-described characteristics is illustrated. As shown, the method 300 initially determines 302, 304 a candidate list and a filter list as previously described. The method 300 then generates 306 a search list from the candidate list and the filter list. As will be shown in FIG. 4, the search list may be generated using the following logical operation: search list={not (cand_list XOR filt_list)}.

Once the search list has been generated 306, the method 300 generates 308 a first command and sends 308 the command to the tape drive 110c. This command may be populated with search strings from the search list, as will be shown in more detail in association with FIGS. 7A and 7B. In effect, this command causes the tape controller 212 to search for the first data set in the backup archive that is not identified by one of the search strings. When the tape controller 212 encounters such a data set, the search stops and the controller 212 returns the data set to the host device 102. The method 300 then analyzes 310 this data set to determine 312 if the data set is identified in the filter list. If the data set is identified in the filter list (i.e., is a data set requested to be restored), the method 300 restores 314 the data set.

If, at any point during execution of the method 300, the method 300 determines 316 that all data sets in the filter list have been restored, the method 300 ends since there are no remaining data sets to look for. Similarly, the method 300 determines 318 whether the end of the tape has been reached after each search. If the end of the tape has been reached, the method 300 also ends since there are no more data sets in the backup archive to search.

If neither condition 316, 318 is met, the method 300 generates 320 the next search command and sends 320 the command to the tape drive 110c. This command may also be populated with search strings from the search list. This command will cause the tape controller 212 to start a new search beginning from the last accessed portion of the backup archive. The tape controller 212 then returns the first data set it encounters that is not one identified by the search strings within the command. The returned data set is then analyzed 310 and restored 314 if identified in the filter list. The method 300 continues to perform searches and analyze the results in the above-described manner until either all the data sets in the filter list have been restored or the end of the tape is reached.

Referring to FIG. 4, a specific example is provided to show the operation of the apparatus and method illustrated in FIGS. 2 and 3. In this example, the candidate list ("cand_list"), which identifies data sets that are potentially contained within a backup archive, contains data sets {d1, d2, d3, d4, d5, d6, d7, d8, d9, d12, d13, d14, d16, d18, d22, d27, d28, d32}. The filter list ("filt_list"), which identifies data sets that are desired to be restored from the backup archive, contains data sets {d2, d3, d4, d5, d6, d7, d16, d27, d28, d32}. The search list ("srch_list"), which may be calculated using the operation {not (cand_list XOR filt_list)}, contains data sets {!d1, !d8, !d9, !d12, !d13, !d14, !d18, !d22}. As previously discussed, the search list identifies data sets that should be ignored (i.e., skipped over) when searching the backup archive.

As previously mentioned, the data sets that are actually contained in the backup archive may be unknown. Assume, for the purposes of this example, that the backup archive contains the data sets {d1, d2, d4, d8, d9, d18, d32} as shown in the backup list ("back_list"). Using the filter list and the backup list, the data sets that will be restored from the backup archive will include {d2, d4, d32} as shown in the restoration list ("rest_list"). In actuality, the restoration list will not be known until all of the data sets are restored.

Figure 5A:
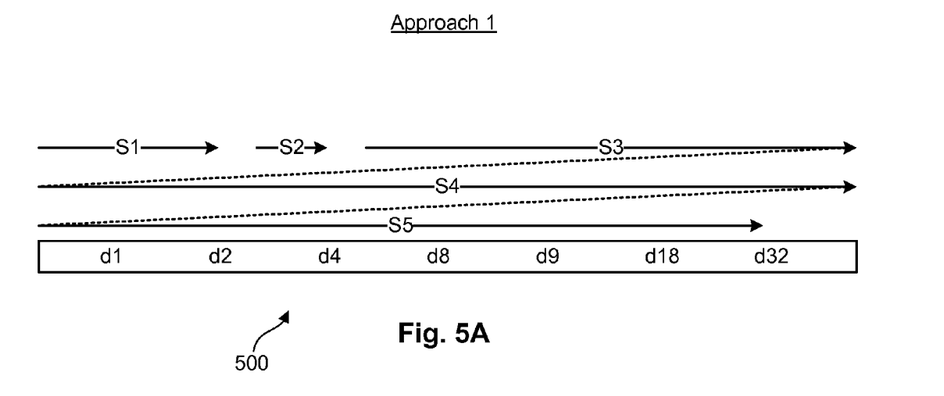
FIGS. 5A and 5B show one possible (but non-ideal) approach for searching the backup archive identified in FIG. 4.
Figure 5B:
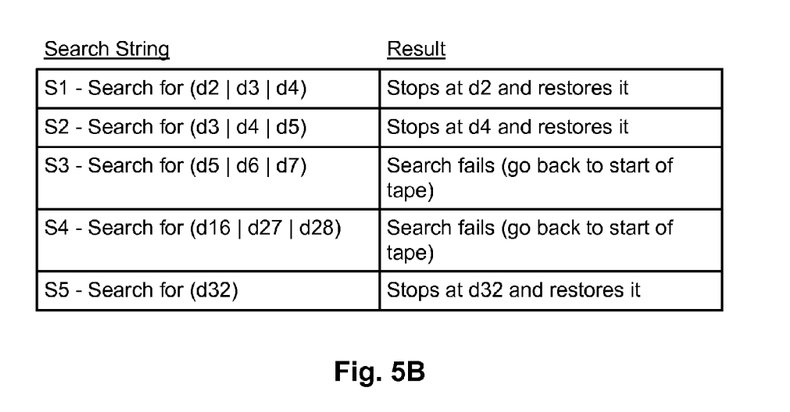
Figure 6A:
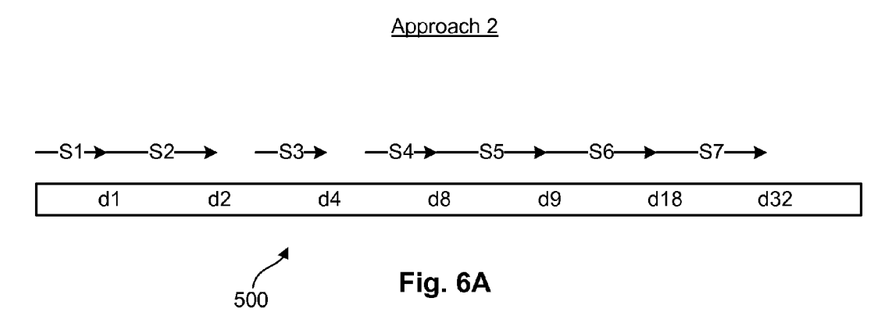
FIGS. 6A and 6B show another possible (but non-ideal) approach for searching the backup archive identified in FIG. 4.
Figure 6B:
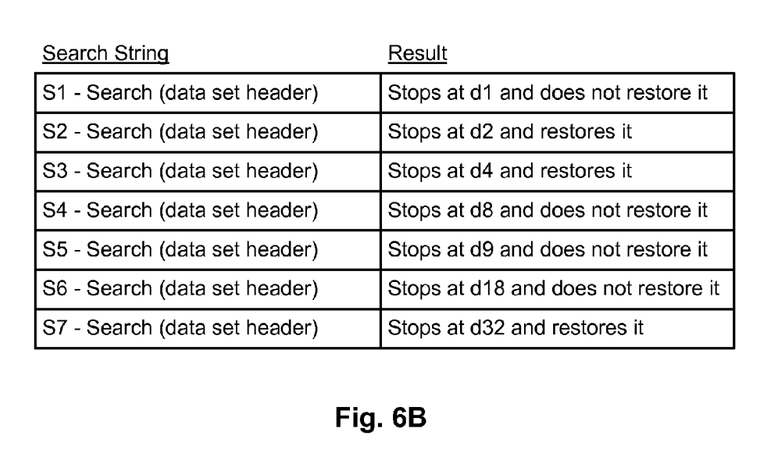
Figure 7A:
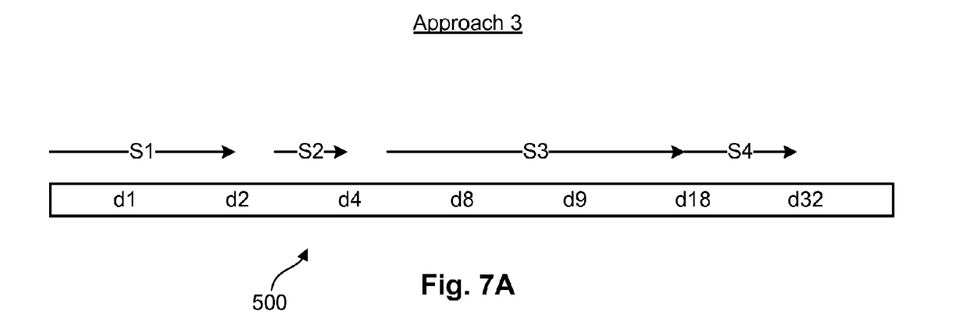
FIGS. 7A and 7B show a significantly more efficient approach for searching the backup archive identified in FIG. 4.
Figure 7B:
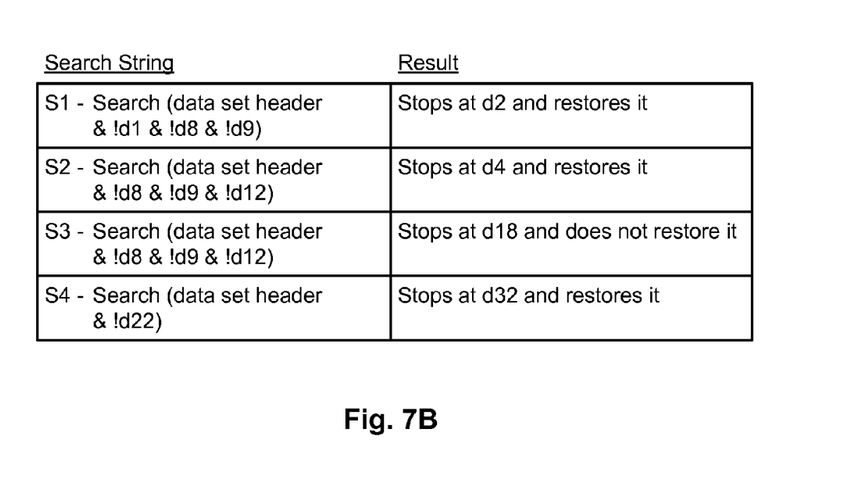

Using the sample data shown in FIG. 4, several different approaches may be used to try to recover the data sets identified in the filter list from the backup archive. These approaches are illustrated in FIGS. 5A through 7B. More specifically, FIGS. 5A and 5B show a first non-ideal approach ("Approach 1") for searching the backup archive. FIGS. 6A and 6B show a second non-ideal approach ("Approach 2") for searching the backup archive. Finally, FIGS. 7A and 7B show a significantly more efficient approach ("Approach 3") for searching the backup archive.

Referring to FIGS. 5A and 5B, Approach 1 involves creating search criteria that searches for the specific data set headers that are requested to be restored. This approach provides poor performance for two reasons. First, the minimum number of searches is equal to the number of data sets in the filter list divided by the number of data sets that can be searched at any one time. This may cause more searches to be performed than are necessary since the number of data sets in the filter list may be greater than the number of data sets in the restoration list. Second, this approach may pass over data sets that are to be restored.

For example, consider searching the backup archive 500 (as shown in the back_list of FIG. 4) using Approach 1. For the purposes of this example, assume that the search command can only accept three search strings as input. As shown in FIGS. 5A and 5B, using this approach, a first search (S1) using the search strings (d2, d3, and d4) as input would begin at the start of the tape and stop upon encountering a data set matching one of the search strings. In this example, the first search (S1) would stop at data set d2 and restore it. A second search (S2) using strings (d3, d4, and d5) as input would continue from the end of data set d2 and stop at data set d4 and restore it. A third search (S3) using strings (d5, d6, and d7) as input would continue from the end of data set d4. Search S3 would fail, however, because the backup archive 500 does not contain d5, d6, or d7. This will cause search S3 to encounter the end of the tape, requiring the tape to be rewound to the beginning of the tape. A fourth search (S4) using strings (d16, d27, and d28) as input would continue from data set d4 but would also fail because the backup archive 500 does not contain d16, d27, or d28. This search will also encounter the end of the tape, requiring the tape to be rewound to the beginning of the tape. A fifth search (S5) using string (d32) as input would continue from data set d4 and stop at data set d32 and restore it.

As shown in FIG. 5A, the major flaw of Approach 1 is that this approach searches for data sets that may or may not be in the backup archive 500. This causes a search to have to scan the entire backup archive 500 in order to determine if a data set matches one identified in the search criteria. The affect of this is that subsequent searches must restart the search from the beginning of the backup archive 500. This will likely require rewinding the tape. This is an inefficient approach and may cause the tape head to pass over the same section of tape several times.

Referring to FIGS. 6A and 6B, Approach 2 involves searching for any data set header that can be located in the backup archive. This approach is acceptable for some cases but may perform poorly when the number of data sets to be restored (i.e., the number of data sets in the filter list) is much less than the number of data sets in the backup archive 500.

For example, consider searching the backup archive 500 using Approach 2. As shown in FIGS. 6A and 6B, using Approach 2, a first search (S1) searching for any data set header would stop at data set d1 but not restore it (because d1 is not in the filter list). A second search (S2) would continue searching from data set d1 and stop at data set d2 and restore it (because d2 is in the filter list). A third search (S3) would continue searching from the end of data set d2 and stop at data set d4 and restore it. The searches (S4-S7) would continue in this manner until all of the data sets in the filter list are restored or the end of the tape is reached.

Although effective, Approach 2 is inefficient because a search will stop at every data set in the backup archive 500 regardless of whether the data set is in the filter list or not. Restoring data sets in this manner requires reading each data set in the backup archive 500 to determine if the data set is one to be restored. This may not be a problem where the backup archive 500 contains a small number of data sets. However, if the backup archive 500 contains a large number of data sets relative to the number of data sets in the filter list, reading and inspecting each of the data sets in this manner may consume significant processing time and resources. In the worst case, the data sets to be restored could be the last data sets in the backup archive 500.

Referring to FIGS. 7A and 7B, the third more efficient approach ("Approach 3") involves searching for any data set header that can be located in the backup archive 500, while skipping over data sets that are identified in the search list. This approach will reduce or minimize the number of searches needed to search the backup archive 500, while still ensuring that the searches collectively perform only a single pass through the backup archive 500.

For example, consider searching the backup archive 500 using Approach 3, assuming that the search command can accept three search strings as input. As shown in FIGS. 7A and 7B, a first search (S1) using the search strings (data set header & !d1 & !d8 & !d9) as input would begin at the start of the tape and stop upon encountering any data set header which is not one of the search strings. In this example, the first search (S1) would skip over data set d1 (because it is one of the search strings) and stop at data set d2 and restore it. A second search (S2) using the search strings (data set header & !d8 & !d9 & !d12) as input would continue searching from the end of data set d2 and stop at data set d4 and restore it. A third search (S3) using the search strings (data set header & !d8 & !d9 & !d12) as input would continue from the end of data set d4. This search would skip over data sets d8 and d9 (because they are identified by the search strings) and stop at data set d18. However, d18 would not be restored because it is not in the filter list. Finally, a fourth search (S4) using the search string (data set header & !d22) as input would continue searching from data set d18 and stop at data set d32 and restore it.

As shown in FIG. 7A, the entire backup archive 500 may be traversed using a total of four searches using this more efficient approach. This is an improvement over Approach 1, which conducts five searches, and Approach 2, which conducts seven searches. Accordingly, Approach 3 minimizes or otherwise reduces the number searches required to search the backup archive 500 compared to Approach 1 and Approach 2. Furthermore, the searches associated with Approach 3 collectively perform only a single pass through the backup archive 500, thereby eliminating the need to rewind the tape. This is an improvement over Approach 1 which needs to rewind the tape several times due to failing searches. Thus, Approach 3 may reduce processing time compared to Approach 1.

The flowcharts and block diagrams in the Figures illustrate the architecture, functionality, and operation of possible implementations of systems, methods, and computer-usable media according to various embodiments of the invention. In this regard, each block in the flowcharts or block diagrams may represent a module, segment, or portion of code, which comprises one or more executable instructions for implementing the specified logical function(s). It should also be noted that, in some alternative implementations, the functions noted in a block may occur out of the order noted in the Figures. For example, two blocks shown in succession may, in fact, be executed substantially concurrently, or several blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method to efficiently restore data from a sequential-access backup archive, the method comprising:
   receiving a candidate list identifying data sets that are potentially contained within a backup archive configured to be accessed sequentially, the candidate list being provided in an environment where it is unknown which data sets are actually contained in the backup archive;
   receiving a filter list identifying data sets that are desired to be restored from the backup archive;
   generating, from the candidate list and the filter list, a search list identifying data sets that are to be ignored when searching the backup archive, wherein the search list is separate from the filter list;
   sequentially performing a plurality of searches in the backup archive such that the plurality of searches collectively performs a single pass through the backup archive, wherein a first search of the plurality of searches begins at a beginning of the backup archive, and each successive search of the plurality of searches begins from a last accessed portion of the backup archive, and each of the plurality of searches stops upon one of the following occurring: (1) encountering a data set not listed in the search list regardless of whether the data set is listed in the filter list, and (2) encountering an end of the backup archive; and
   upon encountering a data set not listed in the search list, restoring the data set if the data set is listed in the filter list.

2. The method of claim 1, wherein the backup archive is stored on a tape drive.

3. The method of claim 1, wherein each data set contains a variable amount of data.

4. The method of claim 1, further comprising initiating each of the plurality of searches using a search command.

5. The method of claim 4, wherein the search command accepts a limited number of search strings as input.

6. The method of claim 5, wherein a number of searches in the plurality of searches is dependent upon a number of search strings accepted as input by the search command.

7. The method of claim 5, wherein a number of data sets identified in the filter list is greater than a number of search strings accepted as input by the search command.

8. An apparatus to efficiently restore data from a sequential-access backup archive, the apparatus comprising:
   at least one processor;
   at least one memory device coupled to the at least one processor and storing instructions for execution on the at least one processor, the instructions causing the at least one processor to:
      acquire a candidate list identifying data sets that are potentially contained within a backup archive configured to be accessed sequentially, the candidate list being provided in an environment where it is unknown which data sets are actually contained in the backup archive;
      acquire a filter list identifying data sets that are desired to be restored from the backup archive;
      generate, from the candidate list and the filter list, a search list identifying data sets that are to be ignored when searching the backup archive, wherein the search list is separate from the filter list; and
      sequentially perform a plurality of searches of the backup archive such that the plurality of searches collectively performs a single pass through the backup archive, wherein a first search of the plurality of searches begins at a beginning of the backup archive, and each successive search of the plurality of searches begins from a last accessed portion of the backup archive, and each of the plurality of searches stops upon one of the following occurring: (1) encountering a data set not listed in the search list regardless of whether the data set is listed in the filter list, and (2) encountering an end of the backup archive; and
      upon encountering a data set not listed in the search list, restore the data set if the data set is listed in the filter list.

9. The apparatus of claim 8, wherein the backup archive is stored on a tape drive.

10. The apparatus of claim 8, wherein each data set contains a variable amount of data.

11. The apparatus of claim 8, wherein the instructions further cause the at least one processor to generate a search command for each of the plurality searches.

12. The apparatus of claim 11, wherein the search command accepts a limited number of search strings as input.

13. The apparatus of claim 12, wherein a number of searches in the plurality of searches is dependent upon a number of search strings accepted as input by the search command.

14. The apparatus of claim 12, wherein a number of data sets identified in the filter list is greater than a number of search strings accepted as input by the search command.

15. A computer program product to efficiently restore data from a sequential-access backup archive, the computer program product comprising a non-transitory computer-readable storage medium having computer-usable program code embodied therein, the computer-usable program code comprising:
   computer-usable program code to acquire a candidate list identifying data sets that are potentially contained within a backup archive configured to be accessed sequentially, the candidate list being provided in an environment where it is unknown which data sets are actually contained in the backup archive;

computer-usable program code to acquire a filter list identifying data sets that are desired to be restored from the backup archive;

computer-usable program code to generate, from the candidate list and the filter list, a search list identifying data sets that are to be ignored when searching the backup archive, wherein the search list is separate from the filter list;

computer-usable program code to sequentially perform a plurality of searches of the backup archive such that the plurality of searches collectively performs a single pass through the backup archive, wherein a first search of the plurality of searches begins at a beginning of the backup archive, and each successive search of the plurality of searches begins from a last accessed portion of the backup archive, and each of the plurality of searches stops upon one of the following occurring: (1) encountering a data set not listed in the search list regardless of whether the data set is listed in the filter list, and (2) encountering an end of the backup archive; and computer-usable program code to, upon encountering a data set not listed in the search list, restore the data set if the data set is listed in the filter list.

16. The computer program product of claim 15, further comprising computer-usable program code to initiate each of the plurality searches using a search command.

17. The computer program product of claim 16, wherein the search command accepts as input a limited number of search strings.

18. The computer program product of claim 17, wherein a number of searches in the plurality of searches is dependent upon a number of search strings accepted as input by the search command.

19. The computer program product of claim 17, wherein a number of data sets identified in the filter list is greater than a number of search strings accepted as input by the search command.

20. A system to efficiently restore data from a sequential-access backup archive, the system comprising:

a host device to acquire a candidate list identifying data sets that are potentially contained within a backup archive configured to be accessed sequentially, the candidate list being provided in an environment where it is unknown which data sets are actually contained in the backup archive;

the host device further configured to acquire a filter list identifying data sets that are desired to be restored from the backup archive;

the host device further configured to generate, from the candidate list and the filter list, a search list identifying data sets that are to be ignored when searching the backup archive, wherein the search list is separate from the filter list;

a controller to sequentially perform a plurality of searches of the backup archive such that the plurality of searches collectively performs a single pass through the backup archive, wherein a first search of the plurality of searches begins at a beginning of the backup archive, and each successive search of the plurality of searches begins from a last accessed portion of the backup archive, and each of the plurality of searches stops upon one of the following occurring: (1) encountering a data set not listed in the search list regardless of whether the data set is listed in the filter list, and (2) encountering an end of the backup archive; and the controller further configured to, upon encountering a data set not listed in the search list, restore the data set if the data set is listed in the filter list.

21. The system of claim 20, wherein the controller is a tape-drive controller.

22. The system of claim 20, wherein the controller is further configured to receive, from the host device, a search command for each of the plurality searches.

23. The system of claim 22, wherein the search command accepts as input a limited number of search strings.

24. The system of claim 23, wherein a number of searches in the plurality of searches is dependent upon a number of search strings accepted as input by the search command.

25. The system of claim 23, wherein a number of data sets identified in the filter list is greater than a number of search strings accepted as input by the search command.

* * * * *